Jan. 15, 1957 M. J. McDONALD 2,777,146
UTENSIL CLEANING DEVICE
Filed March 2, 1953
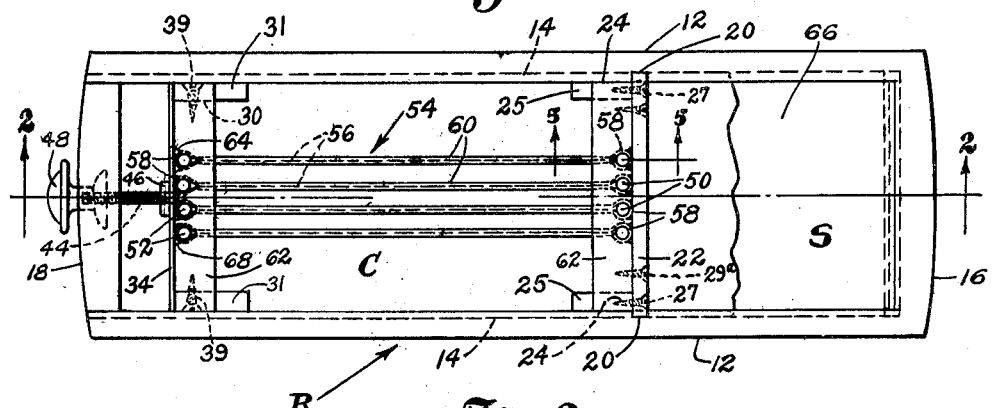
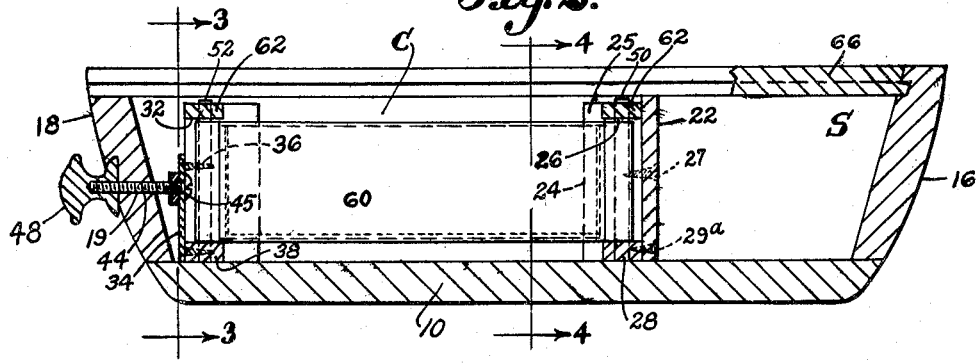
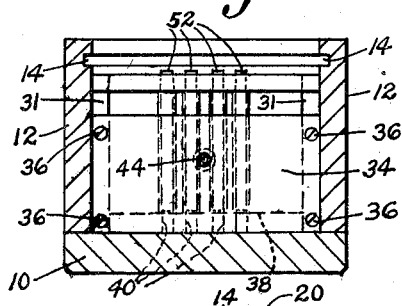
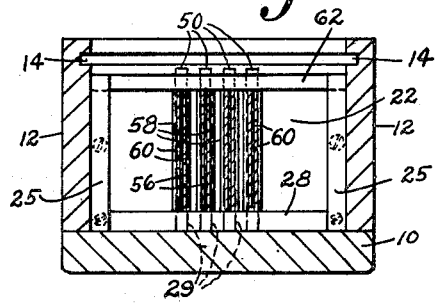
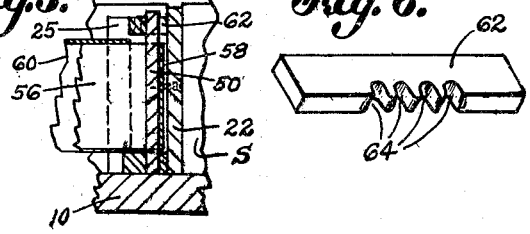
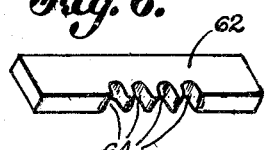
INVENTOR.
Mary J. McDonald
BY Harold E. Cole
Attorney

United States Patent Office 2,777,146
Patented Jan. 15, 1957

2,777,146

UTENSIL CLEANING DEVICE

Mary J. McDonald, Arlington, Mass.

Application March 2, 1953, Serial No. 339,546

5 Claims. (Cl. 15—210)

This invention relates to a utensil cleaning device, especially one to clean and polish the tines of forks and similar instruments.

Reference is made to my co-pending patent application, Serial No. 279,002, filed March 28th, 1952.

One object of my invention is to provide a device to clean and polish the tines, or other teeth, of an instrument that has two or more of them spaced laterally apart, such as a common table fork has.

Another object is to provide means whereby the cleaning members can be adjusted to either tighten or loosen them as desired.

A further object is to provide such a device that is simple to assemble and disassemble, and convenient to use.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

Figure 1 is a top plan view of my utensil cleaning device, the cover being shown broken away.

Figure 2 is a sectional view taken on the line 2—2 of Figure 1.

Figure 3 is a sectional view taken on the line 3—3 of Figure 2.

Figure 4 is a sectional view taken on the line 4—4 of Figure 2.

Figure 5 is a fragmentary, sectional view taken on the line 5—5 of Figure 1.

Figure 6 is a top plan view of my clamping member.

As illustrated, I provide supporting means shown in the form of a receptacle R, which has a bottom 10, two sides 12 having grooves 14 extending lengthwise adjacent the top, a rear end 16 and a front end 18 having a hole 19 therein, which parts are joined by an adhesive or otherwise. As shown, there are vertically extending slots 20 in said sides 12 and a connector member 22 extends into said slots 20, which serves as a partition to divide the receptacle into a storage chamber S at the rear and into a chamber C at the front where the cleaning operation is performed.

At one end of my device is a mounting assembly which includes said connector member 22, and also two posts 24, one at each corner, which extend upwardly from the bottom and have a reduced top portion 25 to thereby provide said posts with a cut-out or recess 26 at the top for a purpose later explained. Screws 27 hold said posts 24 to said partition 22. A base 28 rests on said bottom 10 and extends between said posts 24, having holes 29 therein, and being attached to said connector member 22 by screws 29a. Said connector member 22, posts 24 and base 28 provide a mounting assembly at the rear of my device that can be withdrawn as a unit.

At the front of the receptacle R; but spaced from the front end 18, is another mounting assembly that has two posts 30, one at each corner, which extend upwardly from the bottom and have a reduced top portion 31 to thereby provide said posts with a cut-out or recess 32 at the top, later explained. A connector 34 shown as a flat, metal plate, is attached by screws 36 to said front posts 30. A base 38 rests on said bottom 10 and extends between said posts 30, being attached by screws 39 to the latter, and having holes 40 therein. Said posts 30, base 38 and connector 34 provide a mounting assembly at the front of my device that can move as a unit.

Adjusting means has a pin or bolt 44 and a control member or knob 48. Said pin or bolt 44 extends from outside said receptacle R through said front end 18 and through said connector 34, having a head 45 bearing against the rear surface of said connector, and on which a nut 46 is screw-threadedly attached that bears against the front surface thereof, thereby holding one end of said bolt 44 in fixed position on said connector 34. At the outside of said front end 18 is said control member or knob 48 screw-threadedly attached to the outside end of said bolt 44 and bearing against said front end 18, whereby movement of said control member on said bolt 44 moves said front assembly in the direction desired.

Anchoring rods 50 extend into said holes 29 in said base 28, being parallel with said rear posts 24. Other anchoring rods 52 extend into said holes 40 in said base 38, being parallel with said front posts 30. There may be one or more said rods 50 and 52 in each assembly, depending upon the need.

Extending between each pair of said rods 50 and 52 is a cleaning member 54 that is greater in width than thickness, and shown in the shape of a blanket, being preferably rectangular, although other shapes could be used, and made of a suitable material, such as flannel or other fabric. From top to bottom its depth should be at least the length of the tines or teeth to be cleaned. This cleaning member 54 preferably has a maintaining member 56 which may be made of canvas or other strong fabric, and which has a loop 58 at each end, which loops are mounted on said rods 52 and 54, thus holding the cleaning members 54 firmly between each said pair.

An outer covering of cleaning cloth 60 covers, in each instance, the portion of said maintaining member 56 between each pair of loops 58 on a said maintaining member 56. The tines of a fork, for instance, rub against opposite side surfaces of cloth 60, as they are drawn alongside of said cleaning members 54. Said cloth 60 may be impregnated with a cleaning chemical to more effectively clean and polish simultaneously.

To firmly support said rods 50 I provide a clamping member 62 having a plurality of grooves 64 therein, there being one groove for each said rod. Said clamping member 62 is placed opposite the reduced top portions 25 of said posts 24 and in said recess 26 with said rods 50 in said grooves 64. Likewise to support said rods 52 I provide another said clamping member 62 with said grooves 64 therein. It is placed opposite the reduced top portions 31 of said posts 30, in said recess 32 with said rods 52 extending into said grooves 64. A top cover 66 slides in said side grooves 14 and covers both chambers S and C when in place.

With said clamping members 62 placed in clamping position, said cleaning members 54 are firmly held in position between the two mounting assemblies, ready to serve their purpose. The space between two tines of a fork, for instance, receive a said cleaning member 54, there preferably being as many of the latter as are needed to enter all the spaces between the tines, and the fork is drawn over said cloth 60 between a pair of said rods 50 and 52 until the inner surfaces of the tines, making contact with the cloth, are cleaned and polished.

If said cleaning members 54 become somewhat loose on said rods 50 and 52, said knob 48 is rotated, thus screw-threadedly moving it farther onto said bolt 44, which draws the front mounting assembly towards the front end 18 until the cleaning members 54 are tightened. To loosen the latter the knob 48 is rotated in the opposite direction, in other words, screw-threadedly moved partly off said bolt 44.

To remove said front mounting assembly the knob 48 is unscrewed from said bolt 44, the latter is drawn out of said front end hole 19, which frees the front mounting assembly.

What I claim is:

1. A cleaning device comprising supporting means, two supporting assemblies supported by said means and spaced apart, an anchoring rod mounted in each said assembly, and a cleaning member attached to said anchoring rods and extending between them embodying a maintaining member having loops at opposite ends into which said rods extend and an outer covering on said maintaining member extending between said rods.

2. A cleaning device comprising supporting means including a bottom, two supporting assemblies supported by said means and spaced apart, each said assembly embodying a base having a plurality of holes therein and supported by said bottom, a pair of posts supported by said bottom, and a connector member connected to said base and posts, each said post embodying a reduced top portion and having a recess formed by said reduced top portion and the adjoining portion of said top, a plurality of anchoring rods in said base holes and extending parallel with said posts, a plurality of cleaning members extending between said two assemblies, and clamping members adapted to fit into said recesses and bear against part of said reduced top portions and so positioned that they hold said rods in predetermined position.

3. A cleaning device comprising supporting means including a bottom, two supporting assemblies supported by said means and spaced apart, each said assembly embodying a base having a plurality of holes therein and supported by said bottom, a pair of posts supported by said bottom, and a connector member connected to said base and posts, each said post embodying a reduced top portion and having a recess formed by said reduced top portion and the adjoining portion of said top, a plurality of anchoring rods in said base holes and extending parallel with said posts, a plurality of cleaning members extending between said two assemblies, and clamping members adapted to fit into said recesses and bear against part of said reduced top portions, each said clamping member having a plurality of grooves therein, said rods extending into said grooves.

4. A cleaning device comprising supporting means, embodying a bottom, and a front end having a hole therein, two supporting assemblies supported by said bottom and spaced apart, one said assembly being adjacent said front end and the other being spaced rearwardly therefrom, each said assembly embodying a base having a plurality of holes therein and supported by said bottom, a pair of posts supported by said bottom and spaced apart, each embodying a reduced top portion and having a recess formed by said reduced top portion and the adjoining portion of said top, and a connector member connected to said base and posts, one said connector member being fixed to and the other movable on said bottom, a plurality of anchoring rods in said base holes and extending parallel with said posts, a plurality of cleaning members each embodying loops at opposite ends threaded to said posts whereby each cleaning member extends between said assemblies, clamping members adapted to fit into said recesses and bear against part of said reduced top portions, and adjusting means embodying a screw-threaded pin fixedly attached to one said connector member and extending through said front end hole, and a control member screw-threadedly connected to said pin member outside of and bearing against said front end.

5. A cleaning device comprising supporting means embodying a bottom, and a front end having a hole therein, two supporting assemblies supported by said bottom and spaced apart, one said assembly being adjacent said front end and the other being spaced rearwardly therefrom, each said assembly embodying a base having a plurality of holes therein and supported by said bottom, a pair of posts outside of opposite ends of said base and supported by said bottom, each embodying a reduced top portion and having a recess formed by said reduced top portion and the adjoining portion of said top, and a connector member connected to said base and posts, one said connector member being fixed to and the other movable on said bottom, a plurality of anchoring rods in said base holes and extending parallel with said posts, a plurality of cleaning members each embodying loops at opposite ends threaded to said posts whereby each cleaning member extends between said assemblies, clamping members adapted to fit into said recesses and bear against part of said reduced top portions and each having a plurality of grooves therein to receive said rods, and adjusting means embodying a screw-threaded pin fixedly attached to one said connector member and extending through said front end hole, and a control member screw-threadedly connected to said pin member outside of and bearing against said front end.

References Cited in the file of this patent

UNITED STATES PATENTS

| | | |
|---|---|---|
| 833,003 | Safford | Oct. 9, 1906 |
| 1,338,937 | Lanfear | May 4, 1920 |
| 1,745,669 | Fulton | Feb. 4, 1930 |

FOREIGN PATENTS

| | | |
|---|---|---|
| 14,552 | Great Britain | of 1910 |
| 34,939 | Sweden | of 1913 |
| 88,746 | Germany | of 1896 |
| 191,846 | Great Britain | of 1923 |